(12) United States Patent  (10) Patent No.: US 8,549,184 B2
Tang et al.  (45) Date of Patent: *Oct. 1, 2013

(54) USB TRANSACTION TRANSLATOR WITH BUFFERS AND A BULK TRANSACTION METHOD

(75) Inventors: Jinkuan Tang, Beijing (CN); Jiin Lai, Taipei (TW); Buheng Xu, Beijing (CN); Hui Jiang, Beijing (CN)

(73) Assignee: VIA Technologies, Inc., Taipei (TW)

( * ) Notice: Subject to any disclaimer, the term of this patent is extended or adjusted under 35 U.S.C. 154(b) by 232 days.

This patent is subject to a terminal disclaimer.

(21) Appl. No.: 12/959,299

(22) Filed: Dec. 2, 2010

(65) Prior Publication Data
US 2012/0084469 A1   Apr. 5, 2012

(30) Foreign Application Priority Data
Sep. 30, 2010 (CN) .......................... 2010 1 0512011

(51) Int. Cl.
G06F 3/00   (2006.01)
G06F 13/12  (2006.01)

(52) U.S. Cl.
USPC .................................. 710/5; 710/52; 710/62

(58) Field of Classification Search
None
See application file for complete search history.

(56) References Cited

U.S. PATENT DOCUMENTS
6,816,929 B2 * 11/2004 Ueda ............................... 710/56
2011/0219272 A1 * 9/2011 Lai et al. ........................ 714/54

OTHER PUBLICATIONS
Universal Serial Bus Mass Storage Class Bulk-Only Transport; Sep. 31, 1999; Revision 1.0; pp. 1-22.*
U.S. Appl. No. 12/959,261, filed Dec. 2, 2010.
U.S. Appl. No. 12/959,277, filed Dec. 2, 2010.
U.S. Appl. No. 12/862,134, filed Aug. 24, 2010.

* cited by examiner

Primary Examiner — Idriss N Alrobaye
Assistant Examiner — Richard B Franklin
(74) Attorney, Agent, or Firm — Stout, Uxa, Buyan & Mullins, LLP (57) ABSTRACT

The present invention is directed to a universal serial bus (USB) transaction translator and an associated IN/OUT bulk transaction method. A device interface is coupled to a device via a device bus, and a host interface is coupled to a host via a host bus, wherein the host USB version is higher than the device USB version. At least two buffers configured to store data are disposed between the device interface and the host interface. A controller stores the data in the buffers alternately. In a bulk-IN transaction, before the host sends an IN packet, the controller pre-fetches data and stores the data in the buffers until all the buffers are full or a requested data length has been achieved; the pre-fetched data are then sent to the host after the host sends the IN packet. In a bulk-OUT transaction, the controller stores the data sent from the host in the buffers, and the data are then post-written to the device.

16 Claims, 7 Drawing Sheets

USB TRANSACTION TRANSLATOR WITH BUFFERS AND A BULK TRANSACTION METHOD

CROSS-REFERENCE TO RELATED APPLICATIONS

The entire contents of China Patent Application No. 201010512011.X, filed on Sep. 30, 2010, from which this application claims priority, are incorporated herein by reference.

BACKGROUND OF THE INVENTION

1. Field of the Invention

The present invention generally relates to Universal Serial Bus (USB), and more particularly to a USB 3.0 transaction translator (U3TT) and an associated IN/OUT bulk transaction method.

2. Description of Related Art

Figure 1A:
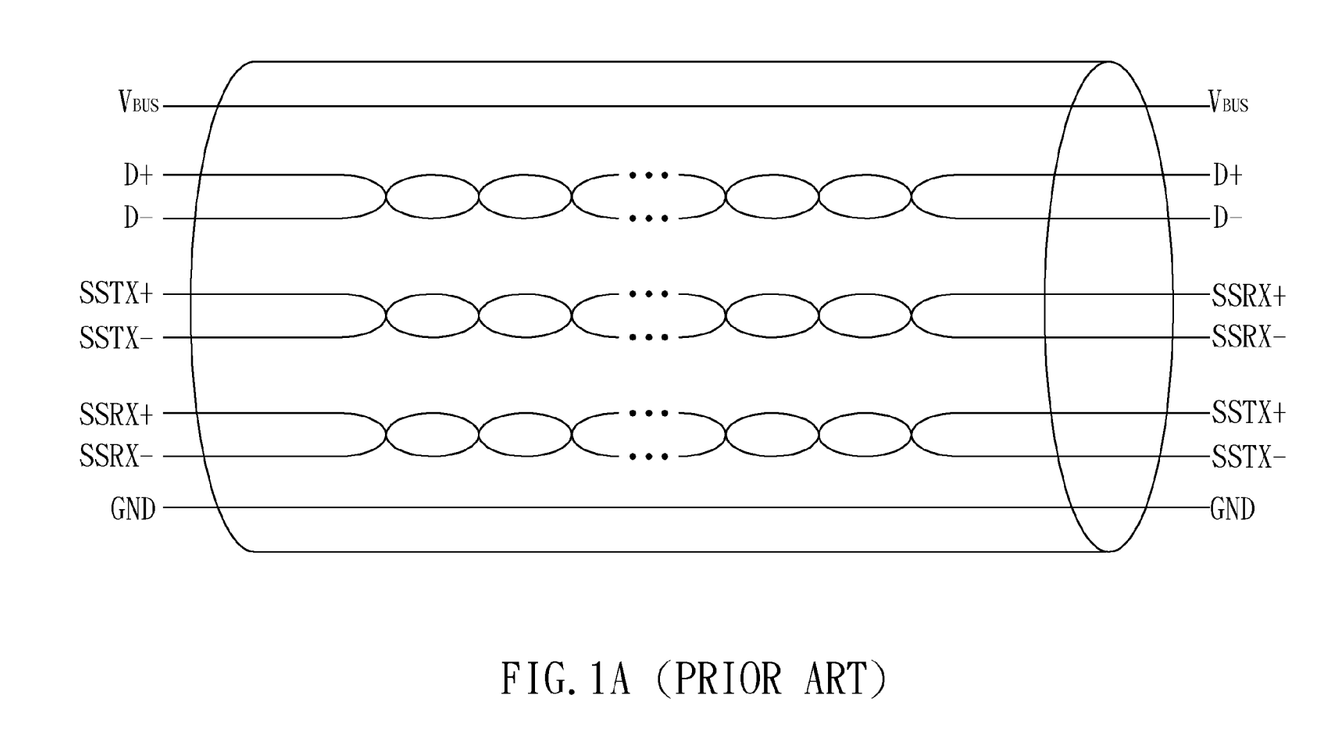
FIG. 1A shows a conventional USB 3.0 cable.

Universal Serial Bus (USB) is a specification of peripheral devices to establish communication between the devices and a host. USB 3.0 was released in 2008, and a USB 3.0 cable is shown in FIG. 1A. In addition to a signal pair D+/D− for USB 2.0 data path, two signal pairs SSTX+/SSTX− and SSRX+/SSRX− are further provided for USB 3.0 SuperSpeed data path.

Figure 1B:
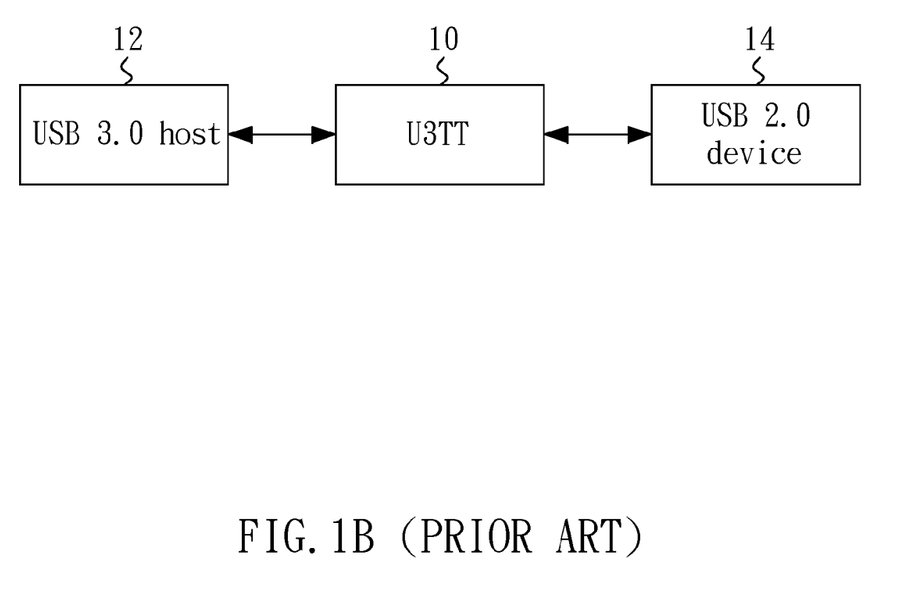
FIG. 1B shows a block diagram illustrating a conventional U3TT coupled between a USB 3.0 host and a USB 2.0 device.

When a USB 2.0 device is coupled to a USB 3.0 host, communication is performed over the non-SuperSpeed data path D+/D−. The applicant of the present invention discloses a USB 3.0 transaction translator (U3TT) in China Patent Application No. 201010129143.4, the disclosure of which is hereby incorporated by reference. The U3TT 10 as shown in FIG. 1B is coupled between the USB 3.0 host 12 and the USB 2.0 device 14, and is utilized to upgrade the USB 2.0 device to act as a quasi-USB 3.0 device such that data transfer speed can be improved.

USB provides four information transfer types: control transfer, bulk transfer, interrupt transfer and isochronous transfer, among which the bulk transfer type is commonly adapted to a mass storage device such as a flash memory for transferring large amount of data between the host and the device. The bulk transfer type uses any available bandwidth and retries packets when errors occur. In other words, the bulk transfer type guarantees the correctness of data but not the bandwidth (or transfer speed).

Figure 2A:
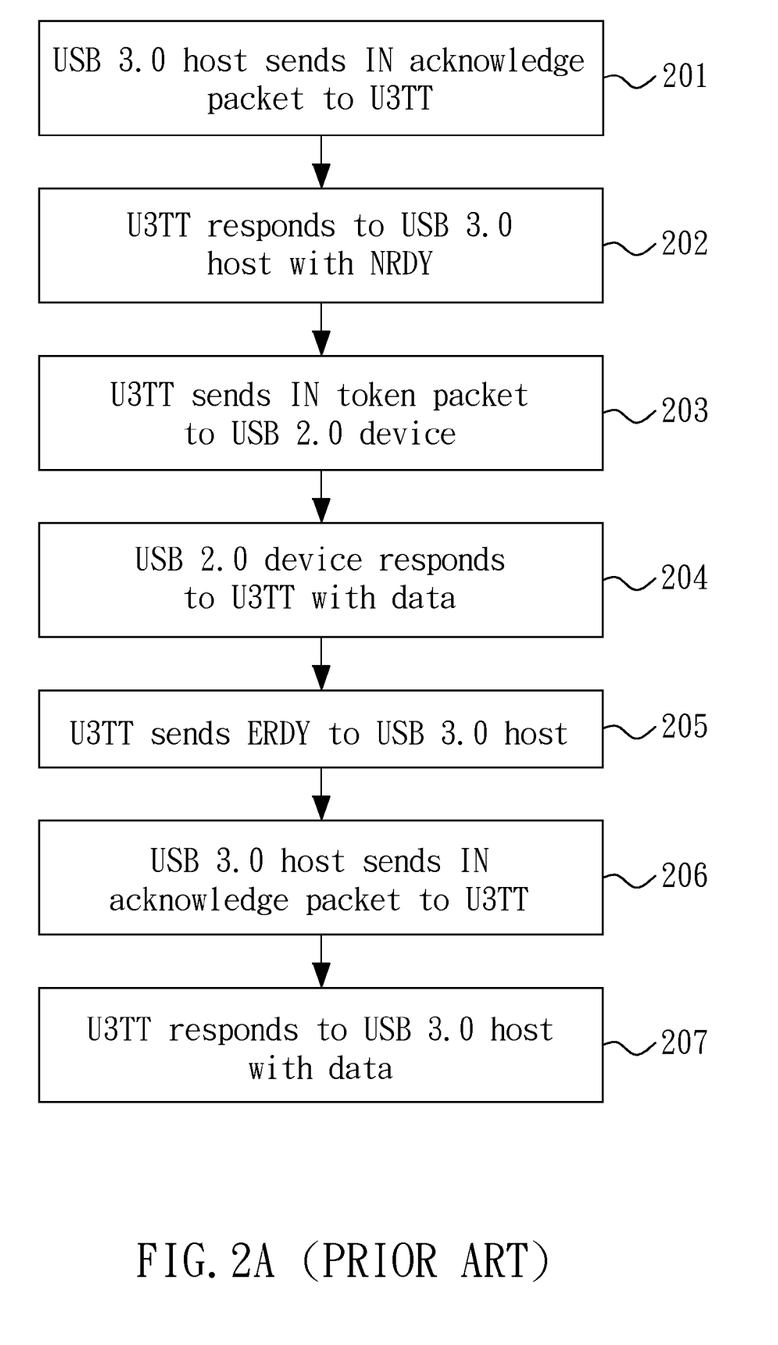
FIG. 2A shows a flow diagram of IN bulk transaction using the conventional U3TT.

FIG. 2A shows a flow diagram of IN bulk transaction using the U3TT. In step 201, the USB 3.0 host sends an acknowledge packet to the U3TT. The U3TT responds to the USB 3.0 host with a negative acknowledge packet NRDY indicating "not ready" in step 202. Subsequently, in step 203, the U3TT translates the USB 3.0 IN acknowledge packet into a USB 2.0 token packet, and then sends the token packet to the USB 2.0 device. The USB 2.0 device then responds to the U3TT with data in step 204. Afterwards, in step 205, the U3TT sends an endpoint acknowledge packet ERDY indicating "endpoint ready" to the USB 3.0 host. The USB 3.0 host re-sends the IN acknowledge packet to the U3TT in step 206, and the U3TT then responds to the USB 3.0 host with data in step 207. According to the flow described above, all steps except steps 203 and 204 do not use the USB 2.0 bus, therefore decreasing system performance.

Figure 2B:
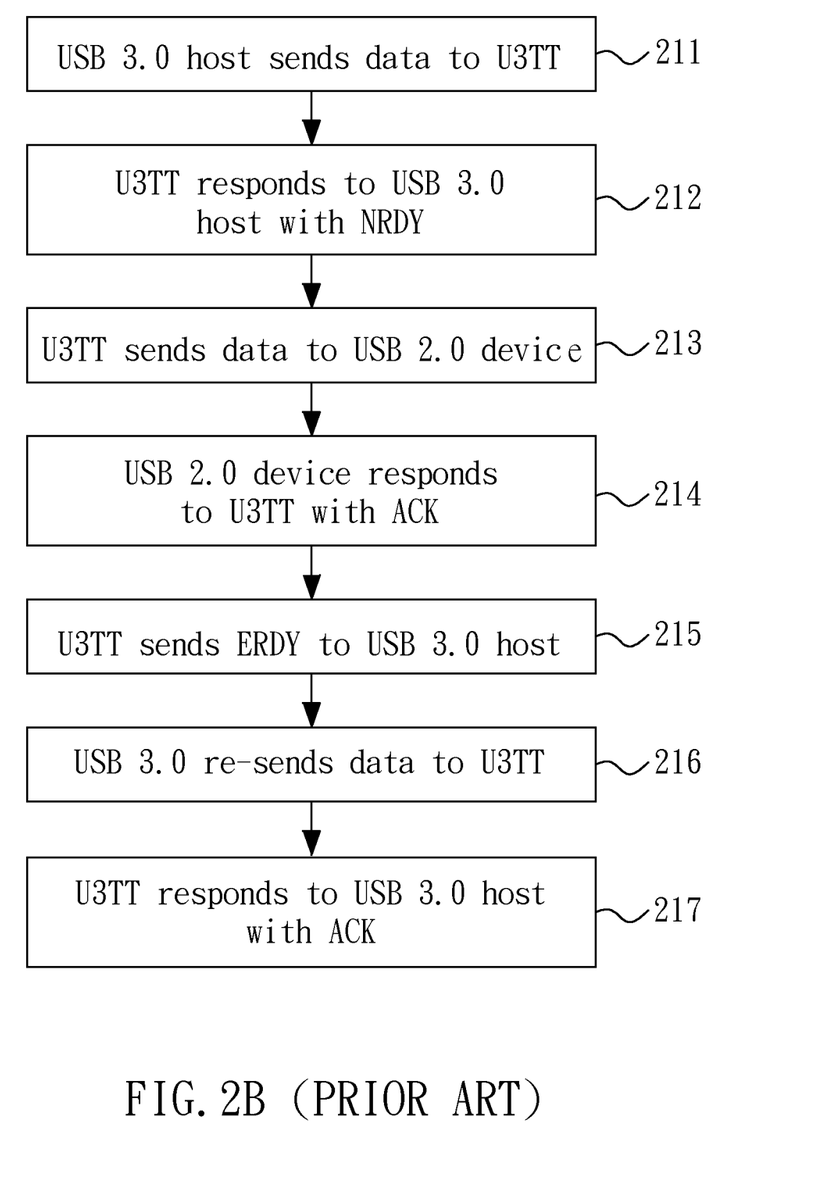
FIG. 2B shows a flow diagram of OUT bulk transaction using the conventional U3TT.

FIG. 2B shows a flow diagram of OUT bulk transaction using the U3TT. In step 211, the USB 3.0 host sends data to the U3TT. The U3TT responds to the USB 3.0 host with a negative acknowledge packet NRDY indicating "not ready" in step 212. Subsequently, in step 213, the U3TT translates the USB 3.0 data into USB 2.0 data, and then sends the USB 2.0 data to the USB 2.0 device. The USB 2.0 device then responds to the U3TT with an acknowledge packet ACK in step 214. Afterwards, in step 215, the U3TT sends an endpoint acknowledge packet ERDY indicating "endpoint ready" to the USB 3.0 host. The USB 3.0 host re-sends the data to the U3TT in step 216, and the U3TT then responds to the USB 3.0 host with an acknowledge packet ACK in step 217. According to the flow described above, all steps except steps 213 and 214 do not use the USB 2.0 bus, therefore decreasing system performance.

In order to improve the performance of bus bandwidth usage, a need has arisen to propose an improved U3TT and a novel IN/OUT bulk transaction method to improve USB 2.0 bus bandwidth usage.

SUMMARY OF THE INVENTION

In view of the foregoing, it is an object of the embodiment of the present invention to provide a USB 3.0 transaction translator (U3TT) and an IN/OUT bulk transaction method, which are capable of substantially improving the usage of USB 2.0 bandwidth.

According to one embodiment, a Universal Serial Bus (USB) transaction translator includes a device interface, a host interface, at least two buffers and a controller. The device interface is coupled to a device via a device bus, and the host interface is coupled to a host via a host bus, wherein the host has a USB version higher than the USB version of the device. The buffers are configured to store data, and are disposed between the device interface and the host interface. The controller is configured to store the data in the buffers alternately. In an IN bulk transaction, before the host sends an IN packet, the controller pre-fetches data and stores the data in the buffers until all the buffers are full or a requested data length has been achieved; and the pre-fetched data are then sent to the host after the host sends the IN packet.

According to one embodiment, in an OUT bulk transaction, the controller stores the data sent from the host in the buffers, and the data are then post-written to the device.

According to an IN bulk transaction method disclosed in another embodiment, a host sends an IN command to a transaction translator. In the embodiment, the IN command is stored. The transaction translator sends an IN token packet to a device according to the IN command, wherein the host has a USB version higher than the USB version of the device. Subsequently, the device responds to the transaction translator with data, and the data from the device are stored in at least two buffers alternately until all the buffers are full or a requested data length has been achieved. When the host sends an IN acknowledge packet to the transaction translator, the transaction translator sends the data stored in the buffers to the host.

According to an OUT bulk transaction method disclosed in a further embodiment, a host sends data to a transaction translator, and the data are stored in at least two buffers alternately. Subsequently, the transaction translator sends the data stored in the buffers to a device. When all the buffers are full, the transaction translator sends a negative acknowledge packet to the host to stop the host from sending the data; otherwise, the transaction translator sends an endpoint acknowledge packet to the host to begin receiving the data from the host.

DETAILED DESCRIPTION OF THE INVENTION

Figure 3:
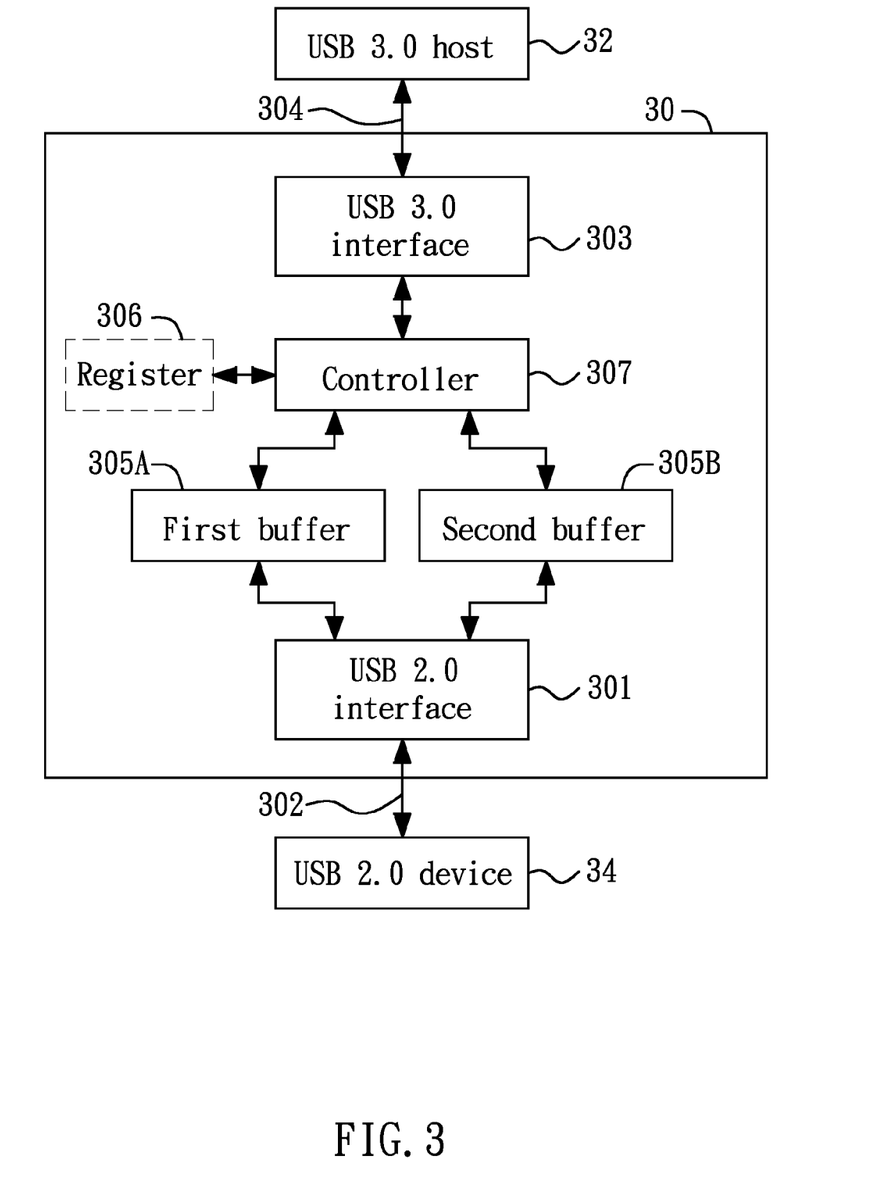
FIG. 3 shows a block diagram illustrated of a Universal Serial Bus (USB) 3.0 transaction translator (U3TT) to establish translation and IN/OUT bulk transaction between a USB 3.0 host and a USB 2.0 device according to one embodiment of the present invention.

FIG. 3 shows a block diagram illustrated of a Universal Serial Bus (USB) 3.0 transaction translator (U3TT) 30 to establish translation and IN/OUT bulk transaction between a USB 3.0 host 32 and a USB 2.0 device 34 according to one embodiment of the present invention. The configuration of the constituent blocks of the U3TT 30 is not limited to that shown in FIG. 3. Although the USB 3.0 transaction translator 30 is demonstrated here, the present invention, however, may be adapted to a higher USB version. The U3TT 30 as shown in FIG. 3 only illustrates the constituent blocks that are pertinent to the present invention, while details may be referred to the above-mentioned China patent application. Details of USB 2.0 and USB 3.0 may be referred to "Universal Serial Bus Specification" and "Universal Serial Bus 3.0 Specification" respectively, the disclosures of which are hereby incorporated by reference.

In the embodiment, the U3TT 30 includes a USB 2.0 interface (or "device interface") 301, which is coupled to the device 34 via a USB 2.0 bus (or "device bus") 302 that is used as a signal interface between the U3TT 30 and the device 34. The U3TT 30 also includes a USB 3.0 interface (or "host interface") 303, which is coupled to the host 32 via a USB 3.0 bus (or "host bus") 304 that is used as a signal interface between the U3TT 30 and the host 32.

According to one aspect of the present embodiment, the U3TT 30 includes two buffers: a first buffer 305A and a second buffer 305B, disposed between the USB 2.0 interface 301 and the USB 3.0 interface 303, for storing data. A controller 307 controllably stores data, for example, in the first buffer 305A, and afterwards stores further data in the second buffer 305B when the first buffer 305A is full. When both buffers 305A and 305B are full, stop storing the data to prevent the stored data from being overwritten. The buffers 305A and 305B that are alternately operated may be called ping-pong buffers. Although two buffers 305A and 305B are demonstrated in the embodiment, a multiple buffering using three or more buffers may generally be applied. Moreover, the first buffer 305A and the second buffer 305B may have different size according to specific applications.

The U3TT 30, when performing IN bulk transaction, may further include a register 306, which is used to record IN data length of the USB 3.0 host 32. The controller 307 of the U3TT 30 not only performs translation but also operates and coordinates the other blocks mentioned above.

Figure 4:
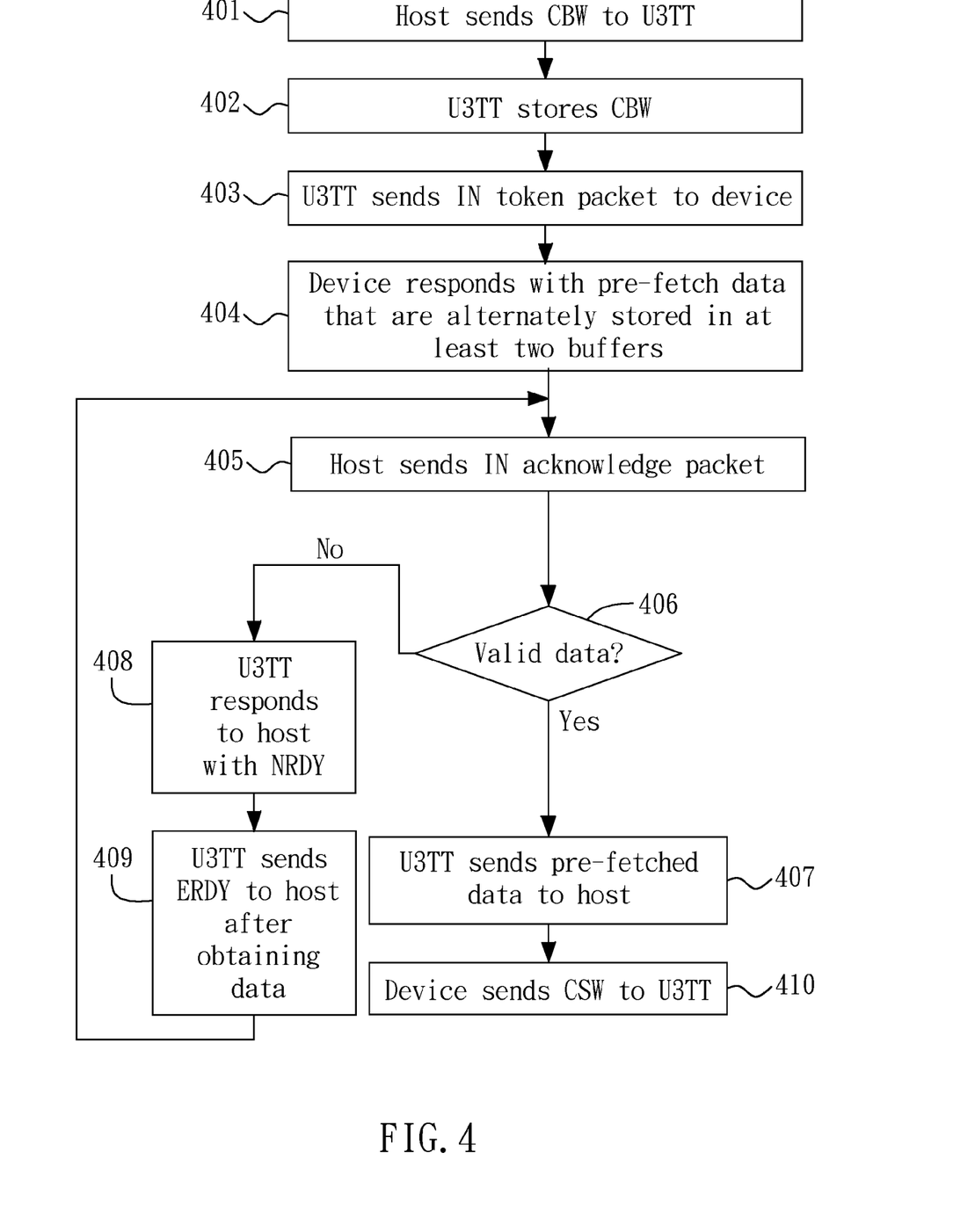
FIG. 4 shows a flow diagram illustrated of an IN bulk transaction method according to one embodiment of the present invention.

FIG. 4 shows a flow diagram illustrated of an IN bulk transaction method according to one embodiment of the present invention. In step 401, the USB 3.0 host 32 sends an IN command to the U3TT 30. In the embodiment, the bulk transaction is performed according to bulk-only transport (BOT) specification, which is specified in "Universal Serial Bus Storage Class-Bulk Only Transport," the disclosure of which is hereby incorporated by reference. According to the BOT specification, the USB 3.0 host 32 sends a command block wrapper (CBW) to the U3TT 30. The content of the CBW includes at least an input/out type, data length and a data address. In step 402, the U3TT 30 stores the CBW in the register 306.

Subsequently, in step 403, the U3TT 30 sends an IN token packet to the device 34 according to the data length of the device 34 regardless of receiving an IN acknowledge packet from the host 32 or not.

In step 404, the device 34 responds to the U3TT 30 with data. The data from the device 34 are alternately stored in the first buffer 305A and the second buffer 305B under the control of the controller 307. When both the buffers 305A and 305B are full, the controller 307 stops sending IN token packet to the device 34 to prevent the stored data from being overwritten.

In step 405, when the host 32 sends an IN acknowledge packet to the U3TT 30, the U3TT 30 directly sends the pre-fetched data stored in the buffers 305A/305B to the host 32 (step 407), if valid data exist in the buffers 305A/305B (step 406). If no valid data exist in the buffers 305A/305B (step 406), the U3TT 30 responds to the USB 3.0 host with a negative acknowledge packet NRDY indicating "not ready" in step 408. After obtaining valid data, the U3TT 30 sends an endpoint acknowledge packet ERDY indicating "endpoint ready" to the host 32 (step 409), followed by sending the IN acknowledge packet to the U3TT 30 (step 405) by the host 32 and responding to the host 32 with valid data by the U3TT 30 (step 407). Finally, according to the BOT specification, the device 34 sends a command status wrapper (CSW) to the U3TT 30 in step 410 to confirm transfer success. As the data are pre-stored in the buffers 305A/305B before transferring to the host 32, the transaction method according to the embodiment may be called an IN pre-fetch bulk transaction method.

The controller 307 monitors the buffers 305A and 305B according to the stored data length when the buffers 305A and 305B are storing data. When a requested data length has been achieved, the controller 307 stops sending the IN token packet to the device 34 and stops receiving data from the device 34.

According to the embodiment, as the bandwidth of the USB 3.0 bus 304 is wider than the bandwidth of the USB 2.0 bus 302, the data in the buffers 305A/305B can be rapidly transferred to the host 32, and the empty buffers 305A/305B may endlessly receive data from the device 34. As a result, the bandwidth usage of the USB 2.0 bus 302 bus may be substantially improved.

The data may be stored in the buffers 305A and 305B according to USB 2.0 specification, and are then translated, i.e., from USB 2.0 to USB 3.0, when reading the data. On the other hand, the data may be translated before they are stored in the buffers 305A and 305B, and may be directly transferred when reading the data.

Figure 5:
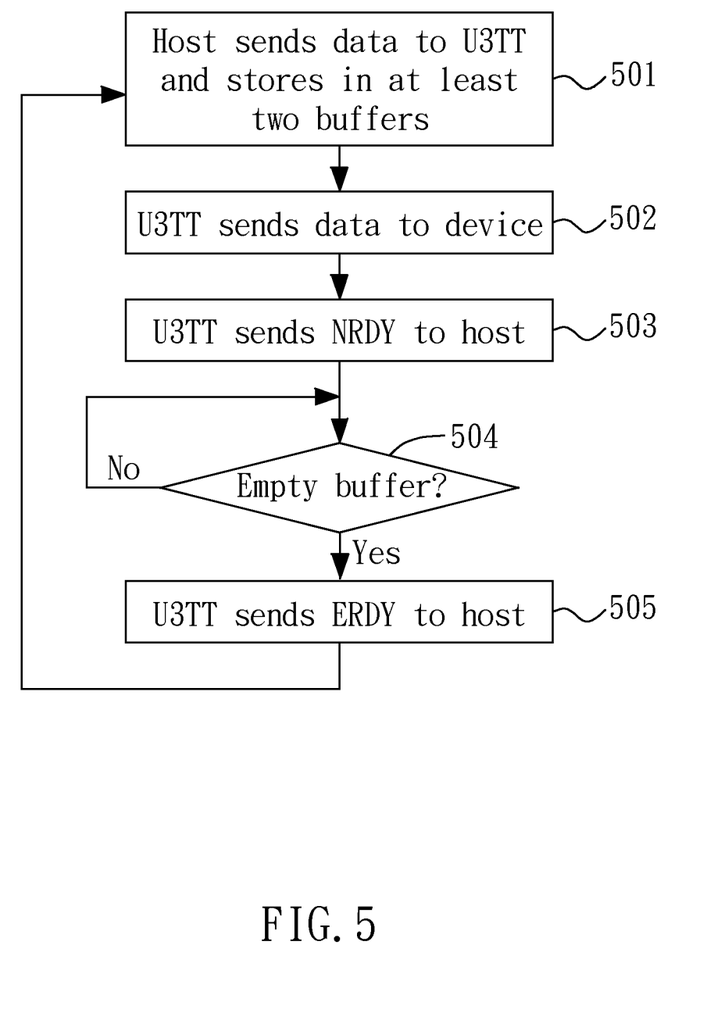
FIG. 5 shows a flow diagram illustrated of an OUT bulk transaction method according to one embodiment of the present invention.

FIG. 5 shows a flow diagram illustrated of an OUT bulk transaction method according to one embodiment of the present invention. The register 306 in FIG. 3 is not necessary when performing the OUT bulk transaction. Further, the IN operation and the OUT operation may use the same or their respective buffers 305A/305B. For the latter case, the IN and OUT operations can be performed simultaneously.

In step 501, the host 32 sends data to the U3TT 30. The controller 307 stores the data alternately in the first buffer 305A and the second buffer 305B. For example, the data are stored in the second buffer 305B when the first buffer 305A is full. At the same time, in step 502, the controller 307 of the U3TT 30 sends the data to the host 34. As the bandwidth of the USB 3.0 bus 304 is wider than the bandwidth of the USB 2.0 bus 302, the buffers 305A and 305B quickly become full. Accordingly, the U3TT 30 sends a negative acknowledge packet NRDY indicating "not ready" to the host 32 under the control of the controller 307, in step 503, in order to stop the host 32 from sending the data and thus prevent the data stored in the buffers 305A/305B from being overwritten. As the data are stored in the buffers 305A/305B before transferring to the host 34, the transaction method according to the embodiment may be called an OUT post-write bulk transaction method.

When the buffer 305A or 305B becomes empty (step 504), the U3TT 30 sends an endpoint acknowledge packet ERDY indicating "endpoint ready" to the host 32 in step 505, and begins to receive data from the host 32 (step 501).

According to the embodiment, as the bandwidth of the USB 3.0 bus 304 is wider than the bandwidth of the USB 2.0 bus 302, the empty buffer 305A or 305B may be quickly refilled via the USB 3.0 bus 304. As a result, at least one of the buffers 305A/305B possesses valid data to be transferred to the device 34 most of the time, therefore substantially improving the bandwidth usage of the USB 2.0 bus 302.

Similar to the IN bulk transaction, the data may be stored in the buffers 305A and 305B according to USB 3.0 specification, and are then translated, i.e., from USB 3.0 to USB 2.0, when reading the data. On the other hand, the data may be translated before they are stored in the buffers 305A and 305B, and may be directly transferred when reading the data.

Although specific embodiments have been illustrated and described, it will be appreciated by those skilled in the art that various modifications may be made without departing from the scope of the present invention, which is intended to be limited solely by the appended claims.

What is claimed is:

1. A Universal Serial Bus (USB) transaction translator, comprising:
    a device interface coupled to a device via, a device bus;
    a host interface coupled to a host via a host bus, wherein the host has a USB version higher than the USB version of the device;
    at least two buffers configured to store data, the buffers being disposed between the device interface and the host interface; and
    a controller configured to store the data in the buffers alternately;
    whereby in an IN bulk transaction, before the host sends an original IN acknowledge packet, the controller pre-fetches data and stores the data, in the buffers until all the buffers are full or a requested data length has been achieved, the pre-fetched, data then being sent to the host after the host sends the original IN acknowledge packet.

2. The USB transaction translator of claim 1, wherein in an OUT bulk transaction, the controller stores the data sent from the host in the buffers, and the data are then post-written to the device.

3. The USB transaction translator of claim 1, wherein the USB version of the host is USB 3.0, and the USB version of the device is USB 2.0.

4. The USB transaction translator of claim 1, wherein the at least two buffers comprise a first buffer and a second butler, wherein the controller stores the data in the first buffer, and then stores the data in the second buffer when the first buffer is full.

5. The USB transaction translator of claim 1, further comprising a register configured to record the requested data length in the IN bulk transaction.

6. A Universal Serial Bus (USB) IN bulk transaction method, comprising:
    sending a data length associated with an IN bulk transaction to a transaction translator by a host;
    the transaction translator sending an IN token packet to a device according to the data length before receiving an original IN acknowledge packet from the host, wherein the host has a USB version higher than the USB version, of the device;
    the device responding to the IN token packet of the transaction translator with data;
    storing the data from the device in at least two buffers alternately until all the buffers are full or a requested data length has been achieved; and
    the transaction translator sending the data stored in the buffers to the host when the host sends the original IN acknowledge packet to the transaction translator.

7. The method of claim 6, further comprising: storing the data length in a register.

8. The method of claim 6, wherein the data length is sent via a command block wrapper (CBW) specified by bulk-only transport (BOT).

9. The method of claim 8, wherein the CBW comprises at least an input/out type, the data length and a data address.

10. The method of claim 6, after the host sends the original IN acknowledge packet, further comprising:
    the transaction translator responding to the host with a negative acknowledge packet when no valid data exist in the buffers; and
    the transaction translator sending an endpoint acknowledge packet to the host after obtaining valid data.

11. The method of claim 6, after sending the data stored in the buffers to the host, further comprising:
    the device sending a command status wrapper (CSW) to the transaction translator to confirm transfer success, wherein the CSW is specified by bulk-only transport (BOT).

12. The method of claim 6, before storing the data in the at least two buffers alternately, further comprising a step of translating the data by the transaction translator.

13. The method of claim 6, after storing the data in the at least two buffers alternately but before sending the data to the host, further comprising a step of translating the data by the transaction translator.

14. A Universal Serial Bus (USB) OUT bulk transaction method, comprising:
    sending data to a transaction translator by a host;
    storing the data in at least two buffers alternately;
    the transaction translator sending the data stored in the buffers to a device before responding to the host with a negative acknowledge packet; and
    when all the buffers are full, the transaction translator sending the negative acknowledge packet to the host to stop the host from sending the data; otherwise, the transaction, translator sending a positive acknowledge packet to the host to begin receiving the data from the host.

15. The method of claim 14, before storing the data in the at least two buffers alternately, further comprising a step of translating the data by the transaction translator.

16. The method of claim 14, after storing the data in the at least two buffers alternately but before sending the data to the device, further comprising a step of translating the data by the transaction translator.

* * * * *